(12) United States Patent
Nordeen

(10) Patent No.: US 10,438,227 B1
(45) Date of Patent: Oct. 8, 2019

(54) SYSTEM AND METHOD OF DISCOURAGING PIRACY THROUGH ONLINE REWARDS PROGRAM

(71) Applicant: Sasha Hyatt Nordeen, Santa Fe, NM (US)

(72) Inventor: Sasha Hyatt Nordeen, Santa Fe, NM (US)

(*) Notice: Subject to any disclaimer, the term of this patent is extended or adjusted under 35 U.S.C. 154(b) by 691 days.

(21) Appl. No.: 15/008,398

(22) Filed: Jan. 27, 2016

Related U.S. Application Data

(63) Continuation of application No. 11/119,040, filed on Apr. 28, 2005, now abandoned.

(60) Provisional application No. 60/567,170, filed on Apr. 29, 2004.

(51) Int. Cl.
*G06Q 30/02* (2012.01)

(52) U.S. Cl.
CPC ................ *G06Q 30/0233* (2013.01)

(58) Field of Classification Search
CPC .................................. G06Q 30/0233
USPC .......................................... 705/14
See application file for complete search history.

(56) References Cited

U.S. PATENT DOCUMENTS

| 6,076,101 A * | 6/2000 | Kamakura | G06Q 10/107 |
| | | | 705/14.27 |
| 2007/0198338 A1* | 8/2007 | Heywood | G06Q 30/0236 |
| | | | 705/14.27 |
| 2009/0083124 A1* | 3/2009 | Murphy | G06Q 30/02 |
| | | | 705/14.16 |

OTHER PUBLICATIONS

Spethmann, B., Partnering for Points, (Mar. 1, 2005), Penton Media Inc., 18 (Year: 2005).*

* cited by examiner

*Primary Examiner* — Matthew L Hamilton
(74) *Attorney, Agent, or Firm* — Franklin & Associates International Inc.; Matthew Lambrinos

(57) ABSTRACT

An improved online rewards program offering automatic reward disbursement once there is a sufficient account balance and providing efficient reward delivery entirely through the internet. The rewards program offers a broad range of opportunities to earn points over the internet through a variety of online vendors from which a customer may choose to shop or earn points through alternate means. The rewards consist of legally obtained instantly deliverable digital products which could have otherwise been illegally downloaded with the aid of online piracy.

11 Claims, 3 Drawing Sheets

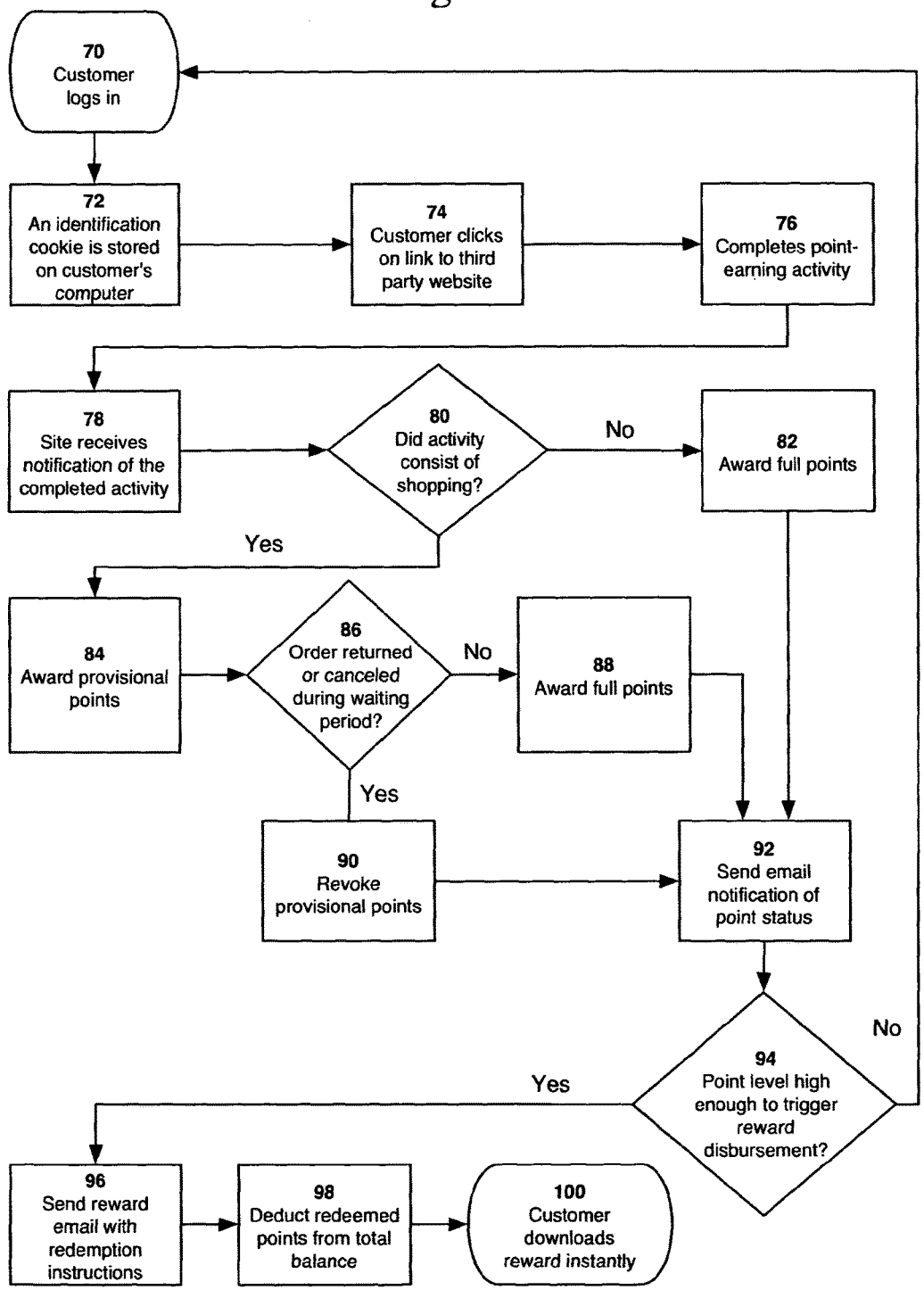

SYSTEM AND METHOD OF DISCOURAGING PIRACY THROUGH ONLINE REWARDS PROGRAM

CROSS REFERENCE TO RELATED APPLICATIONS

This application is a continuation of U.S. Non-Provisional patent application Ser. No. 11/119,040, filed Apr. 28 2005, which claims the benefit of PPA Ser. No. 60/657,170, filed 2004 Apr. 29 by the present inventor. The entire contents of U.S. Non-Provisional patent application Ser. No. 11/119,040, filed Apr. 28 2005, is hereby incorporated herein by reference.

FEDERALLY SPONSORED RESEARCH

Not Applicable.

SEQUENCE LISTING OR PROGRAM

Not Applicable.

BACKGROUND OF THE INVENTION

Field of Invention

This invention relates to incentive and reward programs, specifically to reward programs which operate through the internet.

Background of the Invention

Reward programs have been a popular method of gaining customer loyalty through the accumulation of points, miles, or other tracking systems. The airline industry has instituted "frequent flyer programs" which typically allow a customer to earn a specified number of miles for each flight he purchases. Once the customer has accumulated enough miles in his account, he may redeem a specified number of miles for a "luxury reward," such as a free flight, a hotel stay, or a car rental. This type of program is limited in its avenues of mile accrual, as most programs only award miles for flights taken on the sponsoring program's airline or a subsidiary. This limits the customer's ability to compare prices from multiple airlines while trying to earn miles from one carrier in order to accrue enough miles for redemption. Once the customer has achieved a mileage level capable of being redeemed for a reward, the selection is limited to "luxury rewards," which are products or services the customer would have paid to obtain had a reward certificate been unavailable.

Grocery stores have also adopted their own type of reward programs. A customer is given a reward account, and each purchase the customer makes at the grocery store counts toward the point balance. Once enough points have accumulated, they may be redeemed for a gift certificate or a discount certificate usable at the participating grocery store. This method is limited by how points may be earned, and the only rewards available are "luxury rewards," meaning they serve as a supplement to products and services that would have been purchased had the reward not existed.

Many credit cards also offer reward programs. In one such program, one point is earned for each dollar charged to a credit card. Once the points have reached a sufficient level, customers may browse a catalog of "luxury rewards" and begin the lengthy redemption process. If a customer never completes the redemption process, even if her point level was adequate, the possible rewards will be forfeited.

Reward programs also appear on the internet, such as the one described in U.S. Pat. No. 6,578,012 to Storey. Programs such as these extend the avenues by which customers are able to earn points. This is accomplished by offering more than one possible shopping outlet to choose from while still earning points from one central rewards program. However, the redemption options consist of "luxury rewards." Even though a reward may be chosen online, it still takes a considerable amount of time for the reward to be received, typically through postal mail or a comparable private courier service. If the redemption process is not completed, a reward will never be received, regardless of a customer's point level.

Many of the aforementioned reward programs require a substantial point or mile accrual before redemption becomes available to a customer, meaning that a considerable number of customers are never able to earn a reward. If the customer forgets about her reward account and never follows the redemption process, a possible reward will be forfeited because there is not an automatic reward disbursement system. Most of the above programs also require the customer to complete a lengthy and often complex redemption routine before her reward is even deposited in the mail, where a significant amount of time will pass before arrival. Once the customer has earned the proper number of points or miles for redemption, the choices of rewards are limited to "luxury rewards," such as free flights, hotel stays, car rentals, merchandise, cash rebates, or gift certificates. By earning these items through a rewards program, the customer is able to receive something for free that would have been paid for in the absence of the earned reward. This is a pleasant experience for the customer, but it does not solve a problem or curb theft of any kind.

In recent years, music and other digital products, such as movies, software, and electronic books, have become available through file-sharing networks over the internet. Although readily accessible, these products are pirated copies being illegally obtained and distributed by scores of internet users who are stealing with the aid of technology. Numerous law suits have been filed against those who have downloaded music illegally, many of whom have stolen thousands of songs, costing the music industry millions of dollars and flagrantly violating copyright protection. Since this practice is illegal and harmful, much attention has been focused on finding possible solutions to this pervasive problem. Companies have developed online outlets of legally obtained downloadable music that consumers can purchase over the internet, but this method has not conquered the tempting draw of free illegally obtained music. As a promotional tactic for purchasing legal music online, companies have offered codes on the bottoms of one in three soda bottle caps which give the consumer one free online download of legal music. These types of promotions are short-lived and the recipient of a free song is chosen at random, giving the consumer no real incentive to work toward obtaining legal music for free. Although the convenience afforded by instant online music downloads is appealing, many consumers have demonstrated by their actions that they prefer to receive music for free, even if that means that they must break the law.

In conclusion, insofar as I am aware, no rewards program formerly developed offers a possible solution to a pervasive societal problem while also improving upon the system and offering automatic reward disbursement and instantaneous redemption.

BACKGROUND OF INVENTION—OBJECTS AND ADVANTAGES

Accordingly, several objects and advantages of my invention are to provide an improved online rewards program, to provide a variety of online vendors from which a customer may choose to shop or earn points through alternate means, to provide automatic reward disbursement once there is a sufficient account balance, to provide efficient reward delivery entirely through the Internet, and to provide rewards that could have otherwise been illegally obtained through online piracy. Further objects and advantages of my invention will become apparent from a consideration of the drawings and ensuing description.

SUMMARY

An online rewards program which offers a broad range of opportunities to earn points over the internet, automatic reward disbursement and full online delivery once the account balance reaches a predetermined threshold. Rewards consist of legally obtained digital products which could have otherwise been pirated with the assistance of online file-sharing networks.

DRAWINGS—FIGURES

FIG. 3 is a flowchart illustrating the preferred embodiment of the present invention from an administrative perspective.

DRAWINGS—REFERENCE NUMERALS

Figure 1:
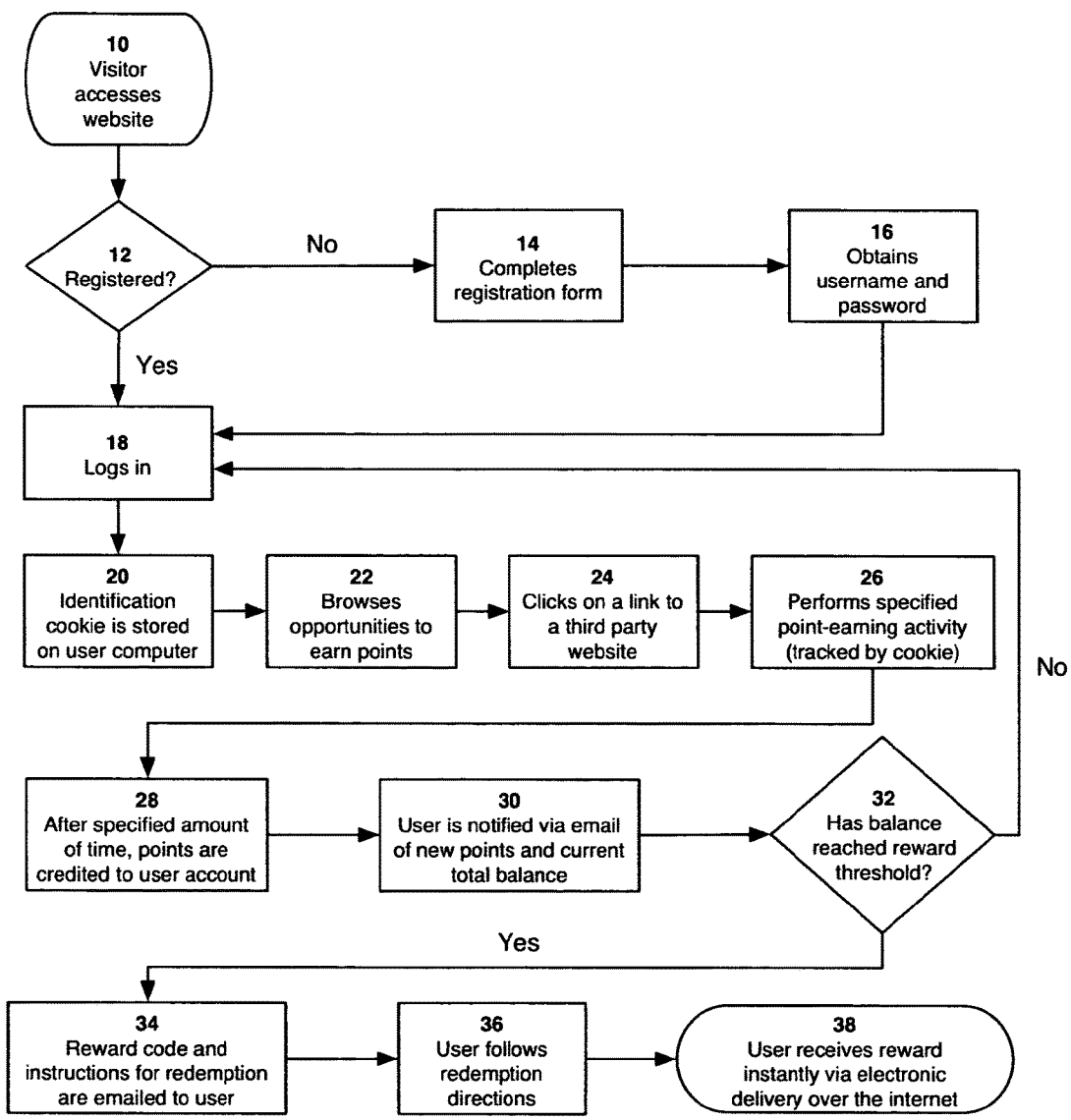
FIG. 1 is a flowchart illustrating the preferred embodiment of the present invention from a customer's perspective.

10 Visitor accesses website
12 Registered?
14 Completes registration form
16 Obtains username and password
18 Logs in
20 Identification cookie is stored on user computer
22 Browses opportunities to earn points
24 Clicks on a link to a third party website
26 Performs specified point-earning activity (tracked by cookie)
28 After specified amount of time, points are credited to user account
30 User is notified via email of new points and current total balance
32 Has balance reached reward threshold?
34 Reward code and instructions for redemption are emailed to user
36 User follows redemption directions
38 User receives reward instantly via electronic delivery over the internet
40 New visitor accesses website
42 Accesses registration form
44 Does website offer more than one possible reward?
46 Selects preferred reward, which will be granted automatically upon achieving reward threshold
48 May change preferred reward any time prior to redemption
50 Completes registration form
52 Logs in
54 Performs point-earning activities
56 Reached reward threshold?
58 Receives chosen reward
70 Customer logs in
72 An identification cookie is stored on customer's computer
74 Customer clicks on link to third party website
76 Completes point-earning activity
78 Site receives notification of the completed activity
80 Did activity consist of shopping?
82 Award full points
84 Award provisional points
86 Order returned or canceled during waiting period?
88 Award full points
90 Revoke provisional points
92 Send email notification of point status
94 Point level high enough to trigger reward disbursement?
96 Send reward email with redemption instructions
98 Deduct redeemed points from total balance
100 Customer downloads reward instantly

DETAILED DESCRIPTION

A preferred embodiment of the present invention is illustrated from a customer's perspective in FIG. 1, and from an administrative perspective in FIG. 3. The present invention's system and method will take the form of a website in its preferred embodiment. A host server will maintain the website's presence on the internet, allowing it to be accessible to anyone with a connection to the Internet, and all user and account information will be stored in a database accessible by the website. Those skilled in the art will understand the intricacies of internet browser operations, internet connections, email operation, basic computer skills, and web server and database operations and interactions. For this reason, the details not directly pertaining to the operation of the current invention, including computers, browsers, the internet, email, and web server and database operations will be assumed to be understood.

When a person with internet access, a visitor or user, accesses the website 10, the visitor will have the option of browsing the website as an unregistered visitor, which will allow the visitor to learn about the website and the services that it has to offer. If the services offered by the website do not appeal to the visitor, the visitor may exit the website without disclosing any personal information or registering for an account. If the visitor has not already registered for an account 12, the visitor may click on a link to the registration form and complete the registration form 14. The registration form collects the visitor's personal information, including but not limited to the visitor's preferred username and password 16, the visitor's email address, first and last name, home address, phone number, birth date, and newsletter subscription preferences. The visitor's personal information is stored securely in a database accessible electronically by the website. Using FIG. 2 as a reference, the preferred embodiment would only offer one possible reward 44, leading the visitor from the registration form 42 to completion of the registration form 50 without the need to select a preferred reward 46, as there would only be one type of reward for the visitor to earn.

Once the visitor has obtained a username and password 16, the visitor may log in 18 to the website. Logging in is a process that involves the visitor entering his username and password, which are then checked against the website's user database in order to ensure that the username and password match that of a registered user. If the username and password entered by the visitor do not match a combination in the registered user database, the visitor will be informed that the log in process was unsuccessful. The visitor may either try again or the visitor may fill out the registration form and become a registered user 14. If the username and password entered by the visitor match a combination in the registered user database, the visitor will be logged in 18, and an identification cookie will be stored on the computer of the visitor 20, or user. A cookie is a piece of information that is stored on the user's computer, not the website's server. The cookie is electronically accessible to the website and will allow the website to track the activity of the user, enabling the website to grant points to the user's account when the user completes a specified activity 26. A tracking code may also be embedded in the user's links on the website, but this method is not preferred, and is therefore not part of the preferred embodiment. More than one cookie may be used at a time for tracking purposes, but at least one active cookie will remain on the user's computer for the entire length of time the user remains logged in to the website. If the user chooses to log out, for example, by clicking a link named "Log Out," the tracking cookie will be destroyed and the user will no longer be logged in to the website. Any activity that occurs while the user is not logged in will be unable to be tracked, meaning the user will be unable to earn points until the user completes an activity again while logged in.

Once the user has successfully logged in 18 and an identification cookie has been successfully stored on the user's computer 20, the user may browse the available opportunities to earn points 22. Points are the cumulative system used to keep track of the user's level in the reward system and how close the user is to earning a reward. After the user registers and logs in to the website, points may be earned by completing specified point-earning activities. These point-earning activities include but are not limited to shopping online from a variety of vendors, reading email newsletters, clicking on certain links, signing up for certain offers, completing surveys, and referring others to the website. All of these activities may be performed through a third party website 24 or in-house through the website to which the user registered. When the user clicks on a link to a third party website, a relationship is enabled that allows the tracking cookie to trace the user's activity and transfer that information back to the website with which the user registered 26. Before completing an activity, the user will be aware of how many points completion of the activity will result in, and the user will also be aware of the details of the activity and any restrictions. This information will be made available through the website that is responsible for granting the points and rewards. For instance, if the user clicks on a link and completes an in-house (the same website, not a third party) survey about the user's car preferences, the user will earn 100 points. Or if the user clicks on a link to a third party website where he is tracked by a cookie while he registers for an account at the third party website, the user will earn 250 points. Both of these examples illustrate irrevocable point-earning opportunities, meaning that once the activity has been completed, there is no way to turn back and void the completed activity. In other words, once the activity has been completed it will always have been completed. When the user completes an irrevocable point-earning activity, the points will not have a waiting period before being fully granted to the user's account 28. Once the website receives notice that the irrevocable point-earning activity has been completed, the points will be credited to the user's account 28 and the user will receive an email notification of the new points and the user's current account balance 30.

If the point-earning activity consists of shopping, or placing a returnable or cancelable order of any kind, this is a revocable point-earning activity. When a user clicks on a link to a third party online shopping vendor 24, the user's activity will be tracked and the website will become aware of any orders that were placed 26. Since each online shopping vendor has its own cancellation policy and return policy, there is a specified waiting period before the points can be fully granted 28. If the points were fully granted while the order could still be returned, it is possible that the user would reach reward disbursement, redeeming a number of points to receive a reward, and then the user could return the order. This would mean that the website which granted the points and gave the reward would be shortchanged, having given points to a user who in fact did not complete a point-earning activity. For this reason, in order to avoid this scenario, provisional points will be granted to the user after placing an online shopping order for the entire duration of the return policy at the particular online shopping vendor in question 84. The user will receive an email notification explaining that the website is aware of the user's shopping activity and provisional points have been granted for a specified amount of time, which differs depending on each vendor's return policy 30. Once the duration of the return policy has passed, if the user did not return the order 86, the provisional points will be converted to full points 88 which are able to be redeemed for a reward. The user will receive an email notification explaining the user's point balance 92. Once the duration of the return policy has passed, if the user returned part of the order, the proper proportion of provisional points will be revoked and the remaining provisional points will be converted to full points which are able to be redeemed for a reward. The user will receive an email notification explaining the user's point balance 92. Once the duration of the return policy has passed, if the user returned the entire order 86, all of the provisional points will be revoked 90. The user will receive an email notification explaining the user's point balance 92.

Upon the granting of any number of full points, the user's account balance will automatically be checked to see if it has reached the reward threshold 32. For instance, when the website only offers one type of reward, such as ten legally obtained online music downloads for every ten thousand points, the account will be checked to see if its balance meets or exceeds ten thousand points. If the balance is beneath ten thousand points, the user will be able to log in again and complete steps 18-32 until the user's point balance meets or exceeds ten thousand points. If the balance has reached the reward threshold 32, which is ten thousand points in the current example, then the account will automatically be triggered for reward disbursement without any further interaction from the user. A reward code, or online gift certificate code, will be emailed to the user with instructions for redemption 34. The reward code may be redeemed in-house, through the website that granted the reward, or the reward code may be redeemed through a third party. For instance, the user will receive an email with instructions, an online gift certificate code and a link to a website where the code may be used 36 to instantly download ten legally obtained songs entirely through the internet 38. The reward may be any legally obtained downloadable product which is delivered entirely through the Internet, including but not limited to music, movies, electronic books, and software.

An alternate embodiment of the present invention would allow the user to choose from multiple reward choices, but the reward disbursement process would remain automated. This embodiment and the preferred embodiment of having only one reward are each illustrated in FIG. 2. In the preferred embodiment, a new visitor accesses the website 40, where the visitor may access the registration form 42. If the website only offers one possible reward 44, the user would complete the registration form with their personal information 50, but the user would not need to choose a reward preference, as there would only be one reward. The user may then log in 52 and perform point-earning activities 54 until the user reaches the reward threshold 56, at which time the user would receive the one type of reward offered by the website's reward program structure 58. In the alternate embodiment, a new visitor accesses the website 40, where the visitor may access the registration form 42. If the website offers more than one possible reward 44, the user would select his preferred reward from the available choices 46. The preferred reward may be changed any time prior to redemption by logging in to the user's account and altering the reward preferences 48. The user would complete the remainder of the registration process by providing the standard personal information required to register 50. The user may then log in 52 and perform point-earning activities 54 until the user reaches the reward threshold 56, at which time the user would receive the reward selected as the user's preference at that time 58.

FIG. 3 is a flowchart showing the present invention from an administrative perspective. A customer who has already completed the registration process logs in 70 and an identification cookie is stored on the customer's computer 72. The customer clicks on a link to a third party website 74 and completes a point-earning activity 76. Since the cookie tracks the customer's activity, the site receives notification of the completed activity 78. The website needs to determine if the activity consisted of shopping 80. If the activity did not consist of shopping, full points may be awarded immediately 82 because it is an irrevocable activity, such as completing a survey or clicking on a specified link. These activities cannot be reversed. After full points are awarded for an irrevocable activity, an email notification is sent to inform the customer of his point balance 92. The website must determine if the customer's point level is high enough to trigger reward disbursement 94. If the answer is no, the customer may repeat steps 70-94 until the point balance is high enough to trigger reward disbursement. If the answer is yes, a reward email will be sent to the customer with redemption instructions 96. The website must deduct the redeemed points from the customer's total point balance 98. Once the customer reads the reward email, the customer is able to download his reward instantly through the internet 100.

If the activity of step 76 did consist of shopping, provisional points will be awarded for the duration of the online shopping vendor's return policy 84. This is because shopping is a revocable activity, meaning that if the order is returned, it will be as though the customer never placed the order in the first place. In other words, shopping activities can be reversed, so full points cannot be granted until the transaction can no longer be reversed. If, after the waiting period, the order was not returned or canceled 86, full points will be awarded 88. After full points are awarded, an email notification is sent to inform the customer of his point balance 92. Once full points have been awarded, the point values will not expire or become invalid after a predetermined interval. The customer will be able to accumulate points until the balance has become eligible for redemption. If, after the waiting period, the order was returned or canceled 86, the provisional points will be revoked 90. If part of the order was returned or canceled, then the appropriate portion of the provisional points will be revoked, and the appropriate portion of the provisional points will be converted to full points. An email notification will be sent to inform the customer of his point balance 92. The website must determine if the customer's point level is high enough to trigger reward disbursement 94. If the answer is no 94, the customer may repeat steps 70-94 until the point balance is high enough to trigger reward disbursement. If the answer is yes 94, a reward email will be sent to the customer with redemption instructions 96. The website must deduct the redeemed points from the customer's total point balance 98. Once the customer reads the reward email, the customer is able to download his reward instantly through the Internet 100.

Description of Alternative Embodiments

As illustrated in FIG. 1, a user would click on a link to a third party website 24 in order to complete a point-earning activity 26. An alternative embodiment of this step would involve the user completing a point-earning activity entirely in-house, or within the structure of the primary website, not utilizing the services of a third party website. However, in the preferred embodiment, point-earning activities would primarily be conducted through third party websites. The activity would be tracked by the use of an identification cookie, or its equivalent, and the activity would be conveyed to the website which provides the points, or the primary website of the present invention.

There are also alternate embodiments of the reward redemption process. As illustrated in FIG. 3, when a customer's point level is high enough to trigger reward disbursement 94, a reward email is sent to the customer with redemption instructions 96. Between these two steps, a reward confirmation email could be sent to the customer. The reward confirmation email would include a congratulatory note informing the customer that his point balance is high enough to qualify for a reward. The email would also include a link that the customer must click in order to confirm that the current email address on record in the customer's profile is still the customer's active email address. The actual reward email with redemption instructions would not be sent until the customer clicked on the link within the confirmation email. The addition of this step would prevent the website of the present invention from sending the reward to an email address that is no longer in use. Once the customer clicked on the confirmation link, the reward redemption process would proceed to steps 96-100 of FIG. 3.

Another alternate embodiment of the reward redemption process comprises of changing the delivery method of step 96 in FIG. 3 from email delivery to postal mail delivery. This would add a considerable amount of time to the reward redemption process, which is why it is not a part of the preferred embodiment. However, it would be possible to deliver the redemption instructions via postal mail, but still allow the user to download the reward instantly over the internet once the user has received the postal mail delivery, or a delivery from an equivalent mail courier.

The two previously described alternate embodiments could also be instituted in combination. For instance, if a customers point balance qualified for a reward, then a reward confirmation email would be sent. If the user did not click on the confirmation link after a reasonable amount of time, the reward redemption instructions could be sent via postal mail or its equivalent to the customers home address stored in the website's customer profile. In general, people change email addresses more frequently and more easily than they change home addresses, so it would be more likely that the reward would reach the customer using this method when the website received no email confirmation. Also, when people move and change their home address, they have the option of having their mail forwarded to their new address. This would assist in sending the customers reward if, in fact, the customers email address and home address had both changed and the customer neglected to inform the website. Once the reward redemption instructions would reach the customer, the customer would be able to download the reward instantly via online delivery.

Alternatively, the telephone could also be used to reach the user in the event that the user did not click on the email confirmation link. Once a customer qualifies for a reward, many avenues of contact are available to the website in order to ensure that the customer receives the reward that has been rightfully earned. However, these alternate forms of contact lower efficiency levels of the current invention, which is why they are not part of the preferred embodiment. Rather, in the preferred embodiment, customers would be made aware through the website that it is important for them to keep their email address on record current, as it will be used for automatic reward delivery. Customers may change their email addresses at any time by logging in to the website and submitting an update to their profile.

In the preferred embodiment, the reward email would contain a code, or an electronic gift certificate, that would enable the customer to download a reward instantly over the Internet from a third party online source. This increases the efficiency of the present invention because it would not need to micromanage reward downloads and reward selection. Instead, the website would provide a gift certificate code capable of being redeemed instantly at a third party online vendor. In an alternate embodiment, the website of the present invention could have an in-house reward redemption process, allowing customers to download their rewards directly from the primary website, never involving a third party. Since it is much more efficient to only manage the rewards program and send an online gift certificate which is redeemable instantly through a third party, in-house reward redemption is not part of the preferred embodiment.

Figure 2:
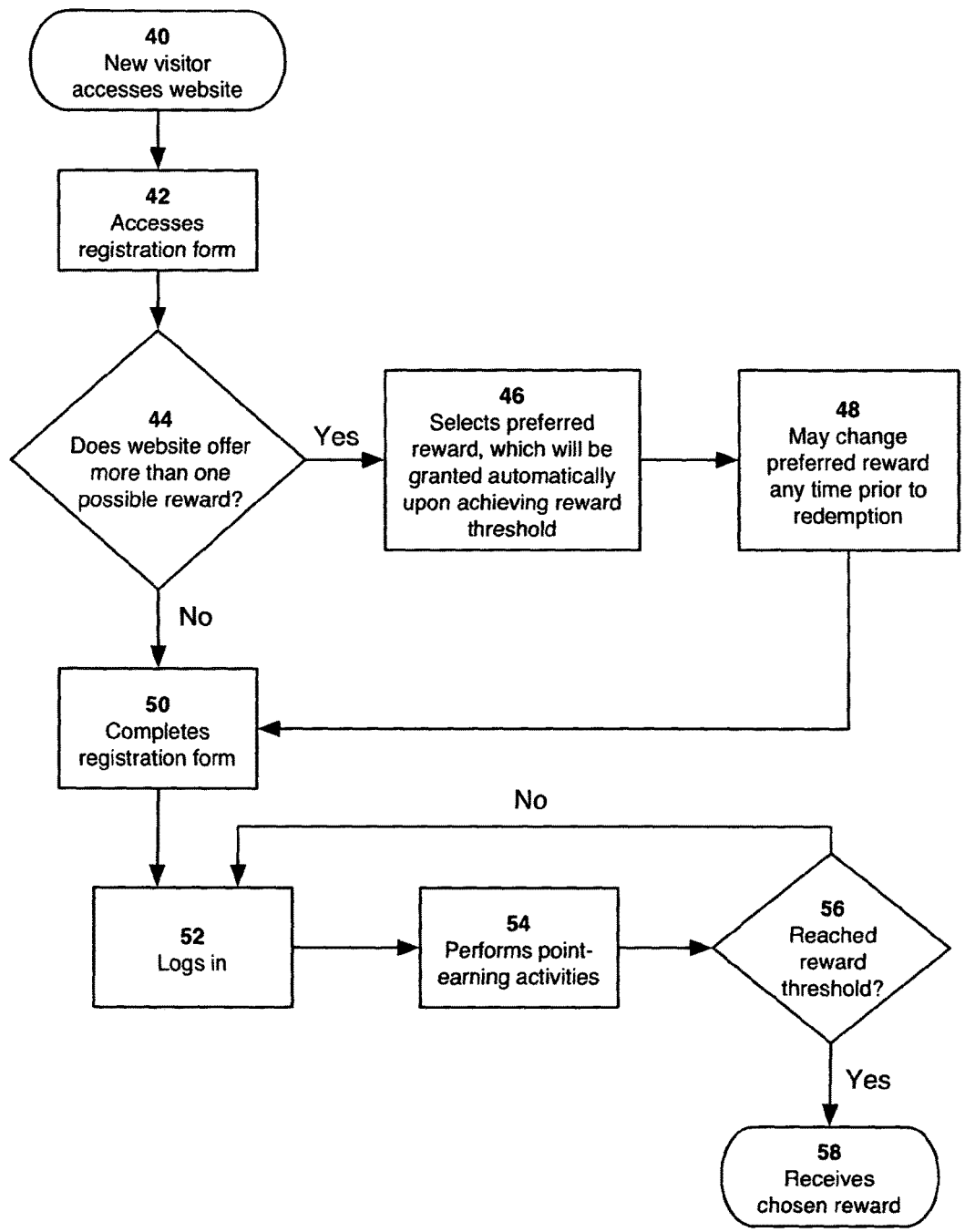
FIG. 2 is a flowchart illustrating the enrollment and reward selection process for two possible embodiments of the present invention.

As described earlier in the detailed description, the rewards program of the website may offer either one reward or more than one possible reward, as illustrated in FIG. 2. The preferred embodiment of the present invention would be a reward structure with only one possible reward, which is detailed in FIG. 2 by answering no at step 44. This increases ease of use and efficiency by allowing customers to accumulate points with the goal of earning one possible reward. Once a customer reaches the reward threshold, the customer will receive the only type of reward offered, such as an online gift certificate redeemable for ten instant online music downloads. An alternate embodiment is illustrated in FIG. 2, answering yes at step 44, which offers the customer more freedom in deciding which reward to work toward earning and is also easily managed. In this embodiment, the user is offered more than one type of reward to choose from, but the user's preferred reward will always remain on file within the user's profile 46. If the user decides to change the preferred reward on record, the user may do so any time prior to reaching the reward disbursement threshold 48 by logging in to the user's account on the website and altering the reward profile on record. In each embodiment, once the user obtains a point balance which qualifies for a reward, the reward will automatically be delivered in the same way, as detailed in FIG. 3, steps 96-100.

In the preferred embodiment, a cookie is used to track the user's activity at third party websites while the user performs a point-earning activity. The actual details of the transaction, or activity that occurs, are tracked by a third party source that specializes in tracking user activity over the Internet. This third party source conveys the activity to the website of the present invention, therefore increasing efficiency of the rewards program by not needing to expend resources on tracking user activity. The third party source also collects and distributes commissions which result from the user activity. The commissions are distributed to the website of the rewards program, and are in turn used to purchase the users reward, minus any profit taken. However, in an alternate embodiment, the user activity may be tracked entirely in-house, not through a third party source. The commissions may also be collected directly, eliminating the need for a third party tracking and payment disbursement resource, although the preferred embodiment utilizes third party resources.

In the preferred embodiment, all point earning activity would occur online, including but not limited to shopping, clicking on links, taking surveys, reading emails, signing up to receive newsletters, signing up for offers, playing online games, referring friends, and completing other online tasks which may be outlined on the website. In an alternate embodiment, points could also be earned offline, meaning in any capacity other than using the Internet. Offline tracking may occur in many ways, including but not limited to the use of a credit card at participating vendors, the use of a credit card that has partnered with the website of the present invention, or the use of any other trackable account belonging to an individual customer who has registered with the website which is accessible by the website. Since allowing customers to earn points offline would entail a considerable amount of additional resources and configuration, it is not part of the preferred embodiment.

CONCLUSION, RAMIFICATION, AND SCOPE OF INVENTION

Thus the reader will see that the rewards program of the current invention provides improved operation and convenience, a variety of options the customer may choose from to earn and accumulate points, automatic reward disbursement once the point balance has reached a specified level, reward delivery instantly over the internet, and a legal means of obtaining free digitally deliverable products which have not been pirated or otherwise compromised. With millions of everyday thieves using the internet to illegally obtain free pirated products, costing the rightful product owners billions of dollars, a legal alternative which remains free to the consumer is needed to help curb online piracy. As online shopping becomes more mainstream with each passing year, consumers using the present invention will be able to buy what they had already planned to purchase over the internet and receive free legal product downloads. This method will be a means for consumers to continue conveniently obtaining digital products for free over the internet while remaining law-abiding citizens.

While my above description contains many specificities, these should not be construed as limitations on the scope of the invention, but rather as an exemplification of one preferred embodiment thereof. Many other variations are possible. For example, altering the tabulation structure of the customer accounts. Instead of using points, which are straightforward and easily understood, it would be possible to use other means of tracking, such as percentages. Also, the tracking method may differ semantically but not symbolically, such as using miles, tokens, or another word which has the same essential meaning. An additional example would include using a method other than cookies to track a user's online activities and enable the user to log in to the website. Rather, the technical equivalent of cookies could be used, which would deliver the same results but would differ slightly in its operation. Another possible variation includes offering digitally deliverable products other than music, movies, electronic books, or software, which are being illegally distributed and pirated online. In the fast moving world of electronics and the internet, it is possible that new digitally deliverable products may be developed which were unforeseeable at the time of this invention, but remain within the spirit of intended reward possibilities. Another possibility would be the institution of expiration dates, which invalidate unredeemed points after a predetermined duration. For an additional example, rather than offering automatic reward disbursement once a customer's point balance has reached a specified level, the website could offer a more traditional redemption process. A more traditional redemption process would include many separate reward levels for varying point balances with differing rewards for the customer to choose from. Rather than having automatic disbursement, the customer would need to follow the directions of the redemption process, most often including the submission of a redemption request. The rewards would still be entirely delivered over the Internet instantly, but the redemption process would be less efficient, take more time, and be more complex for the customer. The customer may never even follow through with the redemption process, meaning that a rightfully earned reward would be forfeited, which does not benefit the customer. For these and other reasons, the ramifications described are not a part of the preferred embodiment of the present invention.

I claim:

1. A computer-implemented system for discouraging online piracy through an online downloadable rewards program comprising:
   a server accessible over an Internet by a user computer;
   a website hosted on said server; and
   a user account stored in a database;
   wherein said server is configured to:
      receive a preselection of one or more online downloadable digitally deliverable products from a user, wherein said one or more online downloadable digitally deliverable products comprises at least one online music audio download, or at least one online movie motion picture download, or at least one online electronic book download, or at least one online software application product download, or any combination thereof;
      send at least one cookie to a user computer for storing on the user computer, said at least one cookie being associated with at least one website, said at least one website being any one or combination of a third party website and an in-house website to which the user is registered;
      electronically access the at least one cookie stored on the user computer;
      track, using said electronically accessed at least one cookie, at least one reward point earning activity performed by the user on the at least one website;
      automatically credit at least one or more points to a user account in response to the tracking, using said electronically accessed at least one cookie, of at least one reward point earning activity;
      automatically determine whether the user account points balance has reached a predetermined reward threshold associated with the preselection of one or more online downloadable digitally deliverable products configured for automatic disbursement in response to the crediting of the at least one or more points;
   automatically deduct one or more points associated with the preselection of one or more online downloadable digitally deliverable products from the user account points balance, absent user intervention, in response to determining said user account points balance has reached said predetermined reward threshold; and
   automatically transmit an e-mail associated with the user, the e-mail containing one or more rewards codes associated with the preselection of one or more online downloadable digitally deliverable products and a hyperlink to a webpage associated with the one or more reward codes to download one or more of the online downloadable digitally deliverable products.

2. The system of claim 1 wherein said at least one reward point-earning activity includes online shopping among a plurality of online retailers.

3. The system of claim 1 wherein said server is configured to transmit or download said one or more online downloadable digital deliverable products in response to receiving said one or more reward codes from said user.

4. The system of claim 1 further comprising a sole online downloadable digitally deliverable product preference prestored in said user account; and wherein said server is configured to pre-select said sole online downloadable digitally deliverable product for downloading over the internet.

5. The system-of claim 1 wherein said server is configured to transmit or download the one or more online downloadable digitally deliverable products from a third party website in response to receiving the one or more reward codes from the user.

6. The system of claim 1 wherein said server is further configured to:
   provide a plurality of online downloadable digitally deliverable product preferences to a user computer;
   receive from said user a user entered pre-selection, among said plurality of online downloadable digitally deliverable product preferences, of a particular online downloadable digitally deliverable product for downloading over the internet;
   store said particular online download pre-selection in said user account.

7. A computer-implemented method of discouraging online piracy through an online rewards program comprising:
   receiving, by a server, a preselection of one or more online downloadable digitally deliverable products from a user, wherein said receiving, by a server, a preselection of one or more online downloadable digitally deliverable products comprises receiving, by a server, a preselection of at least one online music audio download, or at least one online movie motion picture download, or at least one online electronic book download, or at least one online software application product download, or any combination thereof;
   sending, by the server, at least one cookie to a user computer for storing on said user computer, said at least one cookie being associated with at least one website, said at least one website being any one or combination of a third party website and an in-house website to which the user is registered;

electronically accessing, by the server, the at least one cookie stored on the user computer;

tracking, by the server using said electronically accessed at least one cookie, at least one reward point earning activity performed by the user of the at least one website;

automatically, crediting by the server, at least one or more points to a user account in response to the tracking, using said electronically accessed at least one cookie, of at least one reward point earning activity;

determining, by the server, whether the user account point balance has reached a predetermined reward threshold associated with the preselection of one or more online downloadable digitally deliverable products for automatic disbursement in response to the crediting of the at least one or more points;

automatically deducting, by the server, one or more points associated with the preselection of one or more online downloadable digitally deliverable products from the user account point balance, absent user intervention, in response to determining said user account point balance has reached said predetermined reward threshold; and automatically transmitting, by the server, an e-mail associated with the user, the e-mail containing one or more reward codes associated with the preselection of one or more online downloadable digitally deliverable products and a hyperlink to a webpage associated with the one or more reward codes to download one or more of the online downloadable digitally deliverable products.

8. The method of claim 7, further comprising transmitting or downloading, by the server, the one or more online downloadable digitally deliverable products in response to receiving the one or more reward codes from the user;

wherein the transmitting or downloading the one or more online downloadable digitally deliverable products comprises automatically downloading said online digitally deliverable products from said webpage to a user computer in response to receiving said one or more reward codes.

9. The method of claim 7, further comprising storing a sole online downloadable digitally deliverable product preference in said user account; and pre-selecting, using said server, said sole online download digitally deliverable product for downloading over the internet.

10. The method of claim 7, further comprising transmitting or downloading, by the server, the one or more online downloadable digitally deliverable products in response to receiving the one or more reward codes from the user;

wherein the transmitting or downloading the one or more online downloadable digitally deliverable products comprises downloading said one or more online downloadable digitally deliverable products from a third party website using said one or more reward codes.

11. The method of claim 7, further comprising providing a plurality of online downloadable digitally deliverable product preferences to a user computer;

receiving from said user a user entered pre-selection, among said plurality of online downloadable digitally deliverable product preferences, of a particular online downloadable digitally deliverable product for downloading over the internet; and storing said particular online download pre-selection in said user account.

* * * * *